United States Patent Office 2,889,916
Patented June 9, 1959

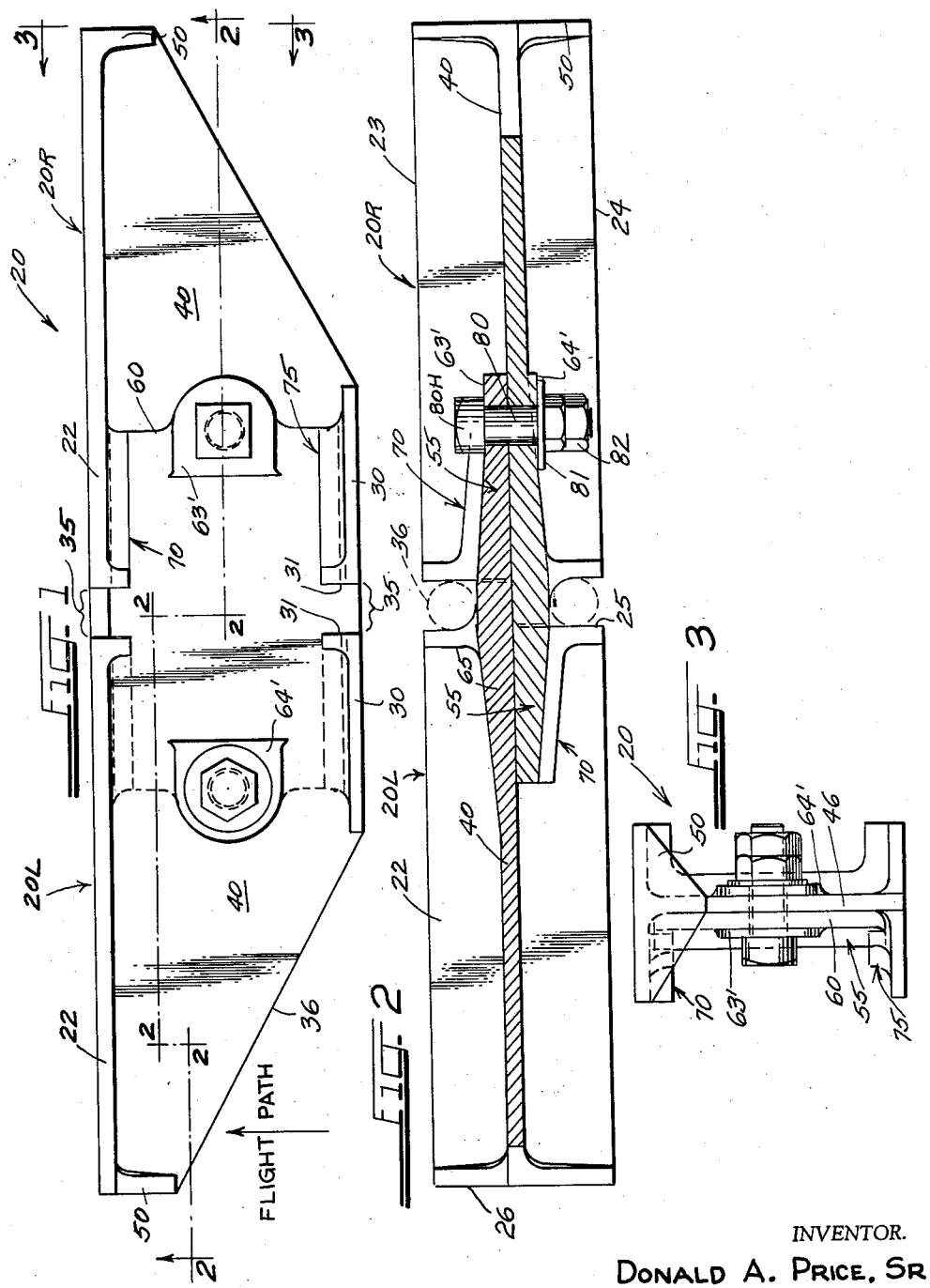

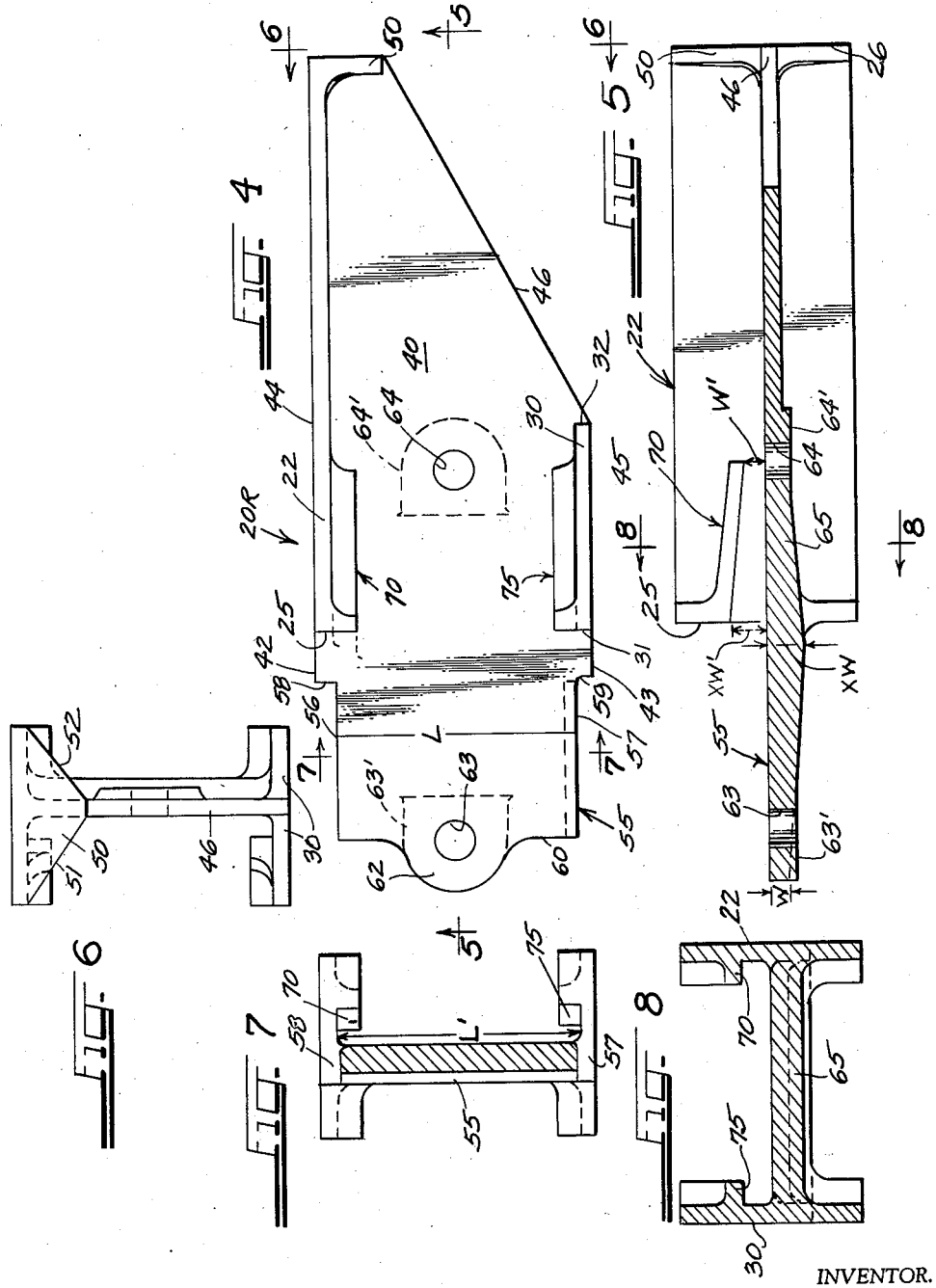

2,889,916

CONVEYOR FLIGHTS

Donald A. Price, Sr., San Leandro, Calif., assignor to American Brake Shoe Company, New York, N.Y., a corporation of Delaware Application August 29, 1957, Serial No. 681,030

6 Claims. (Cl. 198—176)

This invention relates to conveyor flights, and in particular to a conveyor flight which is to include a pair of assembled conveyor flight elements so constructed and arranged as to afford in effect a unitary body but which nevertheless may be readily disassociated one from the other.

The conveyor flight of the present invention is of the kind adapted to be moved along a conveyor path by an endless chain-type conveyor as shown in my U.S. Patent No. 2,595,703. Thus, the conveyor flight of the present invention may be utilized in a wide variety of heavy duty installations such as in saw mill waste transporting equipment, ore processing equipment and the like wherein bulky material is to be moved along an extended path.

The conveyor flight of the present invention includes separable left and right hand sections or elements. It sometimes happens that during the course of flight reversal about a drum or sheave, incompressible blocks of material being moved become trapped between the drum and the conveyor flight causing relative buckling or bridging of the conveyor flight elements. The primary object of the present invention is to prevent such relative displacement of the flight elements by affording spaced lugs on at least one of the conveyor flight elements having opposed faces angled to define a wedge-shaped recess, and forming at least the other of the conveyor flight elements with an integral wedge bar which during initial assembly of the conveyor flight is driven by force into the aforesaid recess. Thus, under the present invention respective parts of the paired conveyor flight elements are tightly wedged together so that the primary method of connection is one attained through wedging action. In this manner, the two paired conveyor flight elements become virtually a unitary body so that there will be no relative displacement thereof in the event of an abnormal operating condition such as that described above at the reversing drum or sheave.

In the preferred form of the invention, the two conveyor flight elements are duplicates, being cast in the same mold cavity one after the other. As a consequence, each flight element is formed with a wedge-shaped recess and a wedge bar complemental to said recess. Identical castings are then selected as left and right hand fully complemental elements with the respective left and right hand wedge bars thereof insertable, respectively, in the right and left hand wedge-shaped recesses. A heavy blow is then delivered to one of the elements driving the wedge bars home, and a fastener serving merely as a pin or cotter is passed through opposed parts of the assembly to maintain the wedge fit. This constitutes the main specific object of the present invention.

Other and further objects of the present invention will be apparent from the following description and claims and are illustrated in the accompanying drawings which, by way of illustration, show a preferred embodiment of the present invention and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a top plan view of an assembled conveyor flight constructed in accordance with the present invention;

Fig. 2 is a sectional view taken substantially on the line 2—2 of Fig. 1;

Fig. 3 is an end elevation taken on the line 3—3 of Fig. 1;

Fig. 4 is a top plan view of a conveyor flight element used for the assembly of Fig. 1;

Fig. 5 is a sectional view taken substantially on the line 5—5 of Fig. 4;

Fig. 6 is an end elevation taken on the line 6—6 of Fig. 4;

Fig. 7 is a sectional view taken on the line 7—7 of Fig. 4; and

Fig. 8 is a sectional view taken on the line 8—8 of Fig. 5.

In Fig. 1 of the drawing there is illustrated a conveyor flight 20 which in the assembled form shown comprises a pair of left and right hand conveyor elements 20L and 20R respectively which in the present instance are identical castings. Inasmuch as the flight elements 20L and 20R are, therefore, of identical construction the designation of parts to follow hereinafter is interchangeable for each section.

Each conveyor flight element in the form of the invention shown in the drawings includes a front flange or plate 22 of relatively large rectangular dimension having parallel upper and lower edges 23 and 24, Fig. 2, and parallel inner and outer end edges 25 and 26 respectively. The flanges 22 are the primary means for pushing the material to be conveyed. The rear flanges 30 to be described maintain vertical the flanges 22 in a plurality of interconnected, spaced apart flights 20, and additionally interconnections to be established as will be explained.

Spaced rearwardly of each flange 22 as viewed in Fig. 1 is a rear or bottom flange 30. Each flange 30, may be of shorter longitudinal dimension than the front flange 22, but sufficient in length to be connected adequately to a web 40 and to support lugs 75 to be described. Thus, referring to Fig. 4, the flange 30 has an inner edge 31 aligned with the inner edge 25 of the forward flange 22, and has an outer edge 32 spaced inwardly of the outer edge of the flange 22, although the flanges 22 and 30 may be substantially equal in length. The relationship is such that when the respective flight elements 20L and 20R are assembled as shown in Figs. 1 and 2, the inner edges 25 and 31 of the respective flanges thus described are adjacent one another but are spaced slightly apart to afford a channel 35 in the medial portion of the conveyor flight assembly. The channel 35 extends circumferentially about the flight 20 in a plane normal to the planes of the flanges 22 and 30 and is of such dimension as to enable the link 36, Fig. 2, of a relatively large chain (not shown) to be centered in the recess 35 to thereby afford a mode of movement for a plurality of conveyor flights 20 associated in spaced relation with spaced links of the conveyor chain. This particular mode of movement is illustrated in somewhat greater detail in my aforesaid patent. In operation, the flight 20 normally follows a flight path indicated by legend in Fig. 1 with the flanges 22 and 30 disposed in planes normal to the flight path.

The flanges 22 and 30 for each conveyor flight element are rigidly joined and integrated by a solid web, 40, and inasmuch as the elements 20L and 20R in the present instance are in the form of one-piece castings of manganese steel or like ferrous alloy it will be appreciated that all parts of the conveyor elements with the exception of certain fastening means to be described hereinafter are continuous or integral. It may be mentioned however that under certain circumstances it may be possible to substitute for the one-piece castings separately cast parts integrated by means of welding.

Each web 40 is so related to the flanges 22 and 30 as to be disposed in an intersecting plane substantially normal to the parallel planes of the flanges 22 and 30. The webs 40 are, however, off-center relative to the medial longitudinal center lines of the flanges 22 and 30 as can be best appreciated from Figs. 2, 5 and 7, and this enables the elements to be associated in a particular manner to be described hereinafter. Thus, each web 40 has spaced longitudinal edges 42 and 43, Fig. 4, which are coplanar with the planes of the outer faces 44 and 45, Fig. 4, of the flanges 22 and 30. Commencing at the outer edge 32 of the flange 30, each web 40 is formed with an outer lateral edge 46 which is directed at an angle toward the opposed front flange 22. The outer edge 46 of the web 40 terminates at what can be viewed as a generally triangular or gusset-shaped reinforcing plate 50, Figs. 4 and 6, having angled lateral edges 51 and 52 which, as viewed in Fig. 6, are beveled upwardly and outwardly and terminate at the opposed edges 23 and 24, Fig. 2, of the front flange 22 adjacent the outer end thereof. It will be appreciated that where merging surfaces of the conveyor flight elements do so at relatively sharp angles, such angles are filleted, rounded that is, for the usual purposes in casting.

Each web 40 at the inner end portion thereof opposite the plate 50 is formed with a relatively large projection 55, Fig. 4, of somewhat reduced dimension having spaced parallel front and rear edges 56 and 57. The reduced dimension of the projection 55 in each instance is such as to afford shoulders 58 and 59 spaced from the inner edges of the flanges 22 and 30, the edges 56 and 57 of the web 40 being parallel to the edges 42 and 43.

The innermost edge 60, Fig. 4, of each web 40 is formed in the medial portion thereof with a rounded protuberance 62 in which is formed an aperture 63 serving a purpose to be described hereinafter. In this same connection, it should be pointed out that the web 40 substantially in the medial or main center area thereof is formed with a second aperture 64 aligned longitudinally with the aperture 63, and the aperture 64 also serves a purpose to be described hereinafter.

Each projecting portion 55 of each web 40 is, as best shown in Figs. 2 and 5, tapered in a progressively widening fashion from a relatively narrow dimension W, Fig. 5, at its free inner end represented by the edge 60 to an appreciably wider dimension XW adjacent the line adjoining the shoulders 58 and 59. The projection 55 of each conveyor flight element as thus afforded constitutes a wedge bar as will be described in more detail hereinbelow. As will be appreciated from Fig. 2, such tapering of the projections 55 affords relatively heavy or thick bearing sections at the medial portion of the assembled conveyor flight elements at areas about the channel 35 wherein the link 36 of the chain is to fit, this area being of course subjected to the severest conveyor and loading forces.

Inasmuch as the shanks of bolts are to be passed through the apertures 63 and 64 as will be described hereinafter and secured in place by means of nuts and washers, the angled faces of each web 40 surrounding the apertures 63 and 64 are cast so as to have flat faces 63' and 64' serving as seats for the washers as can be appreciated particularly from Fig. 2.

Under the present invention, conveyor flight elements as 20L and 20R are joined together primarily as the result of a wedging action utilizing a tapered projection as 55 on one of the conveyor flight elements. The opposing conveyor flight element is provided with spaced lugs having opposed faces so angled as to afford a wedge-shaped recess complemental to the wedge bar of the other conveyor flight element. Such an arrangement can be interchangeably embodied in identical castings as 20L and 20R, which is to say that a plurality of conveyor flight elements as 20L and 20R each embodying a wedge-shaped recess and a complemental wedge bar can be cast using a single mold so that any selected conveyor flight element can be united with any other selected conveyor flight element so cast.

Thus, in achieving the desired wedge-shaped recess the intermediate portion 65, Fig. 5, of a web 40 disposed between the aperture 64 and the inner edges 25 and 31 of the flanges 22 and 30 is utilized as one such recess defining lug, and each conveyor flight element is cast with another lug 70 spaced therefrom. The lug 70 can be conveniently cast on the rear face of the flange 22, and preferably a second lug 75, Fig. 4, is cast on the front face of the flange 30 in alignment with the lug 70. Each lug 70 is disposed in a plane generally normal to the plane of the related flanges 22 and 30, but as shown particularly in Figs. 2 and 5 the lug 70 is so angled that the face thereof opposed to the face of the related web 40 is angled to define a wedge-shaped recess having the largest dimension thereof opening at the inner edge 25 of the related front flange 22. The wedge-shaped recess thus defined is complemental to the wedge bar represented by the projection 55 of the web 40. Thus, the recess defined by and between the angled face of the lug 70 and the opposed face portion of the web 40 in each instance is tapered from a wide dimension XW', Fig. 5, corresponding to the wide dimension XW of the wedge bar, to a narrow dimension W' corresponding to the narrow dimension W of the wedge bar 55.

The lug 70 projects from the rear face of the front flange 22 of each conveyor flight element as mentioned, and preferably a second like lug 75, Figs. 1, 3 and 4, is formed and disposed in a like relation on the inner face of the rear flange 30, that is, on the face of the flange 30 which is opposite the face of the flange 22 on which the lug 70 is formed, and the lug 75 cooperates in the manner described above with the opposed face portion of the web 40 to define a second wedge-shaped recess in which a corresponding portion of the wedge bar 55 of the other conveyor flight element is adapted to fit complementally.

The shoulders 58 and 59 correspond in depth approximately to the thickness of the flanges 22 and 30. Stated in other words, each wedge bar 55 has a transverse dimension L, Fig. 4, but slightly less than the spacing L', Fig. 7, between the opposed faces of the flanges 22 and 30. Such dimensioning of course enables each wedge bar 55 to be inserted in the wedge-shaped recesses defined in part by the lugs 70 and 75 so that the edges 56 and 57 of the wedge bar virtually engage the portions of the flanges 22 and 30 which can be considered as constituting bottom walls of the wedge-shaped recesses.

In assembling the conveyor flight 20, a pair of elements as 20R, Fig. 4, are arranged with the wedge bars 55 thereof pointing toward one another, and the wedge bars 55 are then passed through the relatively large opening in the chain link 36 from opposite sides of the chain link. This of course is accomplished in such a manner that the wedge bar 55 of one conveyor flight element is aligned with the spaced wedge-shaped complemental recesses defined by the web 40 and the lugs 70 and 75 of the other conveyor flight element. The wedge bars 55 are dimensioned so that to effect a mechanically integrated assembly, force fitting is required. When the parts have been properly assembled by such forcing home of the wedge bars, the inner flat face of the wedge bar, Fig. 2, of one flight element will be in tight engagement with the opposed inner flat face of the web of the other flight element. Under such circumstances, the aperture 63 of said one flight element will be aligned with the aperture 64 of said other flight element, and the shoulders 58 and 59, Fig. 4, of one flight element will abut the inner edges 25 and 31 of the flanges of the other flight element. Thus, under the present invention the conveyor flight elements are united primarily as the result of a wedge action such that the flight elements are so tightly joined by wedge splicing as to be incapable of independent movement, and this is particularly important in those instances where jams are encountered during use of the conveyor flight tending to dislodge or shift one flight element relative to the other.

After assembly has been effected in the foregoing manner, union is completed by having resort to nuts and bolts which in effect represent cotters or pins preventing slipping of the wedge bar. Thus, bolts as 80, Fig. 2, having heads 80H are inserted in the aligned apertures 63 and 64 so that the heads thereof are flush with the flat surfaces 63'. The threaded ends of the bolts extend beyond the apertures 64 and a washer 81 is placed on the exposed threaded end of each bolt 80. The washers 81 are adapted to seat flush against the flat surfaces 64', and nuts 82 are then run up on the bolts 80 and tightened simply to prevent end-wise displacement of the wedge bars 55. Various equivalents may be resorted to in place of the nut and bolt fasteners since these are nothing more than cotters.

It will be seen from the foregoing that under the present invention, a detachable or knock-down conveyor flight assembly is afforded by a pair of flight elements each having means thereon affording a wedge-shaped recess and a wedge bar spaced from and complemental to the recess. The taper of the wedge bar proceeds in one direction, viz., narrowed in the direction of one free or exposed edge of the flight element, and the taper of the recess proceeds in the opposite direction, viz., widened in the direction of the aforesaid edge. By aligning such edges of two flight elements, the wedge bar on one is insertable in the recess of the other, whereby the wedge bars are driven home to join the flight elements by a complemental wedge action.

Hence, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a detachable conveyor flight, a pair of substantially identical conveyor flight elements in assembled relation having forwardly facing flanges and adjacent inner edges, webs projecting from said flanges, means affording rigid lug elements rigidly connected to and projecting from substantially identical positions on the rear faces of the flanges of said conveyor elements, said lugs each having a face spaced from the opposed face portions of the related web and each being relatively angled to define with such opposed face portion of the related web substantially identical wedge-shaped recesses, said recesses each having the wide part thereof opening at the inner edge of the related flight element, rigid wedge bars rigidly connected to each of said flight elements and projecting beyond said inner edges thereof, said wedge bars each being tapered complemental to said wedge-shaped recesses and the wedge bar on the one flight element being driven tightly into the opposed wedge-shaped recess of the other flight element, and detachable means passed through opposed parts of the flight elements to maintain the wedging association.

2. In a detachable conveyor flight, a pair of substantially identical one-piece conveyor flight elements each having in assembled relation: a pair of front and rear conveyor flanges disposed in substantially parallel planes and interconnected by a web, said flanges of each such element having aligned inner edges, lugs on the opposed faces of each such pair of flanges and spaced from opposed face portions of said web, said lugs of each element each being angled to define with said opposed faces of the web substantially identical wedge-shaped recesses having the wide ends thereof opening at said inner edges of each such pair of flanges, each of said webs having a projecting portion projected beyond the inner edges of the related pair of flanges, each of said projecting portions being tapered complemental to said wedge-shaped recesses to constitute a wedge bar, the wedge bar of each flight element being tightly driven into said wedge-shaped recesses of the other flight element so that a face of the wedge bar of said one flight element engages the opposed face of the web of the other flight element, and detachable fasteners passed through said wedge bars and webs.

3. In a detachable conveyor flight element, a flange having front and rear faces and inner and outer end edges, a web projecting from the rear face of said flange and disposed in a plane generally normal to the plane of said flange, an elongated lug opposite and spaced from a portion of said web, said lug and web being angled to define a wedge-shaped recess therebetween, said recess having the widest part thereof opening at the inner edge of said flange, said web having a projecting portion extending outwardly beyond said inner edge of said flange and being tapered substantially complemental to said wedge-shaped recess so as to be capable of a wedge fit into the wedge-shaped recess of a like conveyor flight element.

4. In a detachable conveyor flight element, a pair of flanges having outer faces, opposed inner faces and inner and outer end edges, a web joining the opposed inner faces of said flanges, a lug projecting from the inner face of each such flange and being disposed opposite and spaced from portions of said web, said lugs and web being relatively angled to define a pair of wedge-shaped recesses therebetween, said recesses having the widest parts thereof opening at the inner edges of said flanges, and said web having a projecting portion disposed between said lugs and extending outwardly beyond said inner edges of said flanges and being tapered substantially complemental to said wedge-shaped recesses so as to be capable of a wedge fit into the wedge-shaped recesses of a like conveyor flight element.

5. In a detachable conveyor flight, a pair of conveyor flight elements in assembled relation having forwardly facing flanges and adjacent inner edges, rigid means projected rearwardly from the rear faces of said flanges and having opposed faces relatively angled to define wedge-shaped recesses, rigid wedge bars rigidly connected respectively to said flight elements and respectively projected in opposite directions beyond the related flange inner edge, the wedge bar associated with each conveyor flight element being tapered complemental to the wedge-shaped recess of the other conveyor flight element and being tightly driven thereinto, to rigidly join the respective flight elements as a unit, and detachable means passed through opposed parts of the flight elements to maintain the wedging association.

6. In a detachable conveyor flight element having a conveyor flange, rigid means projected from the rear face of said flange defining a wedge-shaped recess, and a rigid wedge bar on said element shaped complemental to that of said recess, the taper of said bar proceeding in a direction opposite to that of said recess whereby two such flight elements may be joined by wedging the bar of one such element into the recess of the other.

References Cited in the file of this patent

UNITED STATES PATENTS

| | | |
|---|---|---|
| 995,952 | Coleman | June 20, 1911 |
| 1,427,229 | Robbins et al. | Aug. 29, 1922 |
| 1,576,520 | Lamb | Mar. 16, 1926 |
| 2,595,703 | Price | May 6, 1952 |